(12) United States Patent
Zayas

(10) Patent No.: US 6,947,245 B2
(45) Date of Patent: Sep. 20, 2005

(54) INCORPORATING REPEATABLE RUN-OUT DURING SELF-WRITING OF SERVO PATTERNS IN A ROTATABLE MEDIA DATA STORAGE DEVICE

(75) Inventor: Fernando A. Zayas, Loveland, CO (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 144 days.

(21) Appl. No.: 10/349,810

(22) Filed: Jan. 22, 2003

(65) Prior Publication Data

US 2004/0141252 A1 Jul. 22, 2004

(51) Int. Cl.[7] .............................................. G11B 21/02
(52) U.S. Cl. ...................................................... 360/75
(58) Field of Search ............................ 360/75, 27, 17, 360/77.11, 77.05, 78.04

(56) References Cited

U.S. PATENT DOCUMENTS

| | | | |
|---|---|---|---|
| 4,616,276 A | | 10/1986 | Workman ..................... 360/77 |
| 5,012,363 A | | 4/1991 | Mine et al. .............. 360/77.05 |
| 5,268,800 A | | 12/1993 | Nielsen .................... 360/77.01 |
| 5,404,253 A | | 4/1995 | Painter .................... 360/77.04 |
| 5,862,005 A | * | 1/1999 | Leis et al. ..................... 360/27 |
| 6,028,731 A | * | 2/2000 | Bond ....................... 360/77.11 |
| 6,061,200 A | | 5/2000 | Shepherd et al. ........ 360/77.04 |
| 6,064,541 A | * | 5/2000 | Sasamoto et al. ........ 360/77.05 |
| 6,204,991 B1 | * | 3/2001 | Karube ..................... 360/78.04 |
| 6,304,407 B1 | * | 10/2001 | Baker et al. .................. 360/75 |
| 6,519,107 B1 | * | 2/2003 | Ehrlich et al. ................ 360/75 |
| 6,704,156 B1 | * | 3/2004 | Baker et al. .................. 360/75 |
| 6,738,205 B1 | * | 5/2004 | Moran et al. ................. 360/17 |

OTHER PUBLICATIONS

"Quad Burst PES System for Disk File Servo," IBM Technical Disclosure Bulletin, Jul. 1978, pp. 804–805, © 1997–2002, Delphion, Inc.

"Seek Time," http://www.logicsmith.com/seektime.html (Nov. 26, 2002), 7 pp., Copyright © 1999 by Albert Dayes and John Treder.

(Continued)

*Primary Examiner*—David Hudspeth
*Assistant Examiner*—Fred F. Tzeng
(74) *Attorney, Agent, or Firm*—Fliesler Meyer LLP

(57) ABSTRACT

Methods in accordance with the present invention can be applied to reduce frictional effects in a bearing of a rotary actuator on the motion dynamics of the rotary actuator. In one such method a disk having a first magnetic servo pattern on a surface written, for example, by a media writer, is rotated at a first frequency. The first magnetic servo pattern is read using a head. A second magnetic servo pattern based on the first magnetic servo pattern can be written to the surface by the head such that the second magnetic servo pattern is defined by the oscillation of the head at a second frequency. This description is not intended to be a complete description of, or limit the scope of, the invention. Other features, aspects, and objects of the invention can be obtained from a review of the specification, the figures, and the claims.

23 Claims, 5 Drawing Sheets

OTHER PUBLICATIONS

"Use of Dither in Digital Servo Control for DASD," IBM Technical Disclosure Bulletin, Oct. 1980, pp. 421–423, © 1997–2002, Delphion, Inc.

Abramovitch, D., et al., "Disk Drive Pivot Nonlinearity Modeling Part I: Frequency Domain," Proceedings of the 1994 American Controls Conference, Jun. 1994, hand-annotated pp. 1–4.

Bickel, R., et al., "Discrete–Time Disturbance Observer and Repetitive Controller with Application to Hard Disk Drives," Tokyo Univ. of Agriculture and Technol, J. MoViC, the $4^{th}$ Internat. Conf. on Motion and Vibration Control, Proc., vol. 2, Zurich, Switzerland, Aug. 25–28, 1998 1999, hand-annotated pp. 1–6.

Goh, T.B., et al., "Design and Implementation of a Hard Disk Drive Servo System Using Robust and Perfect Tracking Approach," IEEE Transactions on Control Systems Technology, vol. 9, No. 2, Mar. 2001, pp. 221–233.

Li, Y., Horowitz, R., "Design and testing of track–following controllers for dual–stage servo systems with PZT actuated suspensions," Microsystem Technologies 8 (2002), pp. 194–205.

Ryoo, J.R., et al., "Design of Disturbance Observer for Track–following Controller of Optical Disk Drive," Proceedings of the International Conference on Control, Automation and Systems (2001), pp. 563–566.

* cited by examiner

I
INCORPORATING REPEATABLE RUN-OUT DURING SELF-WRITING OF SERVO PATTERNS IN A ROTATABLE MEDIA DATA STORAGE DEVICE

FIELD OF THE INVENTION

The present invention relates to rotatable media data storage devices, as for example magnetic or optical hard disk drive technology, and servo technology for hard disk drives.

BACKGROUND OF THE INVENTION

Computer systems are fundamentally comprised of subsystems for storing and retrieving data, manipulating data, and displaying results. Nearly all computer systems today use optical, magnetic or magneto-optical storage media to store and retrieve the bulk of a computer system's data. Successive generations of ever more powerful microprocessors, and increasingly complex software applications that take advantage of these microprocessors, have driven the storage capacity needs of systems higher and have simultaneously driven read and write performance demands higher. Magnetic storage remains one of the few viable technologies for economically storing large amounts of data with acceptable read and write performance.

There are basic components common to nearly all hard disk drives. A hard disk drive typically contains one or more disks clamped to a rotating spindle, heads for reading and writing information to the surfaces of each disk, and an actuator assembly utilizing linear or rotary motion for positioning the head for retrieving information or writing information to a location on the disk. A rotary actuator is a complex assembly that couples the head to a pivot point that allows the head to sweep across the surface of the rotating disk.

The head moves across the surface of the disk writing or reading data to or from concentric tracks on the disk surface. Successive generations of hard disk drives, particularly in laptops and other mobile devices, have scaled to smaller form-factors while simultaneously achieving increases in storage capacity in part by increasing the density of tracks stored on each disk. As track density increases, greater precision is required for movements of the heads. Greater precision in head movements requires improved performance in rotary actuator motion. Improvements in the mechanics of hard disk drives, and in the writing of servo patterns on the disks, have greatly reduced the amount of rotary actuator motion necessary to maintain acceptable track mis-registration (TMR), and seek from head to head on a given cylinder of the hard disk drive. The reduced rotary actuator motion that results from those improvements, however, can negatively impact the low frequency response of the rotary actuator.

BRIEF DESCRIPTION OF THE FIGURES

Further details of embodiments of the present invention are explained with the help of the attached drawings in which.

DETAILED DESCRIPTION

Figure 1:
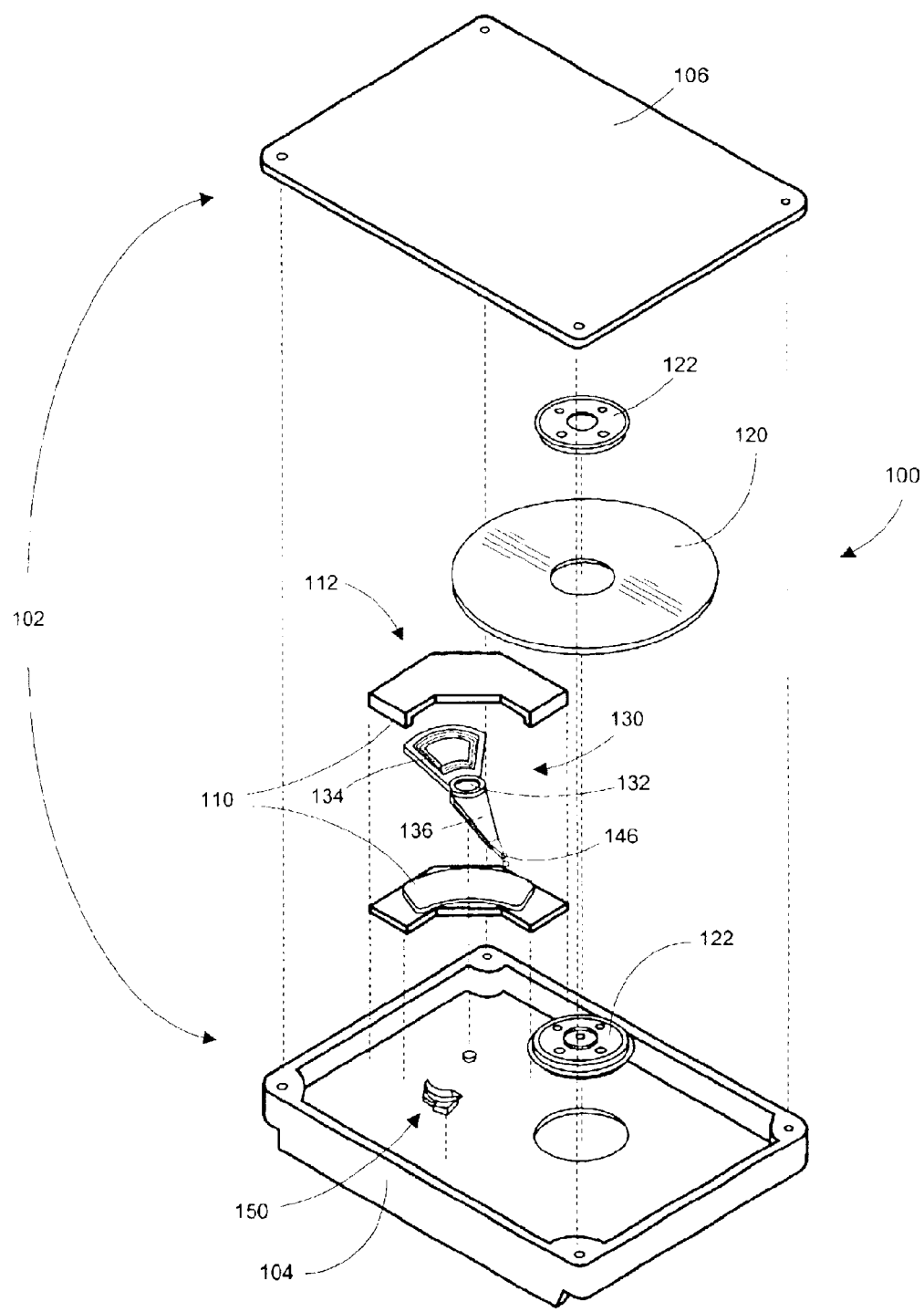
FIG. 1 is an exploded view of a typical hard disk drive for applying a method in accidence with one embodiment of the present invention.

FIG. 1 is an exploded view of a hard disk drive 100 for applying a method in accordance with one embodiment of the present invention. The hard disk drive 100 has a housing 102 which is formed by a housing base 104 and a housing cover 106. A disk 120 is attached to the hub of a spindle 122, with the spindle 122 mounted to the housing base 104. The disk 120 can be made of a light aluminum alloy, ceramic/glass or other suitable substrate, with magnetizable material deposited on one or both sides of the disk. The magnetic layer has tiny domains of magnetization for storing data transferred through heads 146. The invention described herein is equally applicable to technologies using other media, as for example, optical media. Further, the invention described herein is equally applicable to devices having any number of disks attached to the hub of the spindle. The disks 120 are connected to the rotating spindle 122 (for example by clamping), spaced apart to allow a head 146 to access the surfaces of each disk 120, and rotated in unison at a constant set rate typically ranging from 3,600 to 15,000 RPM (speeds of 4,200 and 5,400 RPM are common in hard disk drives designed for mobile devices such as laptops).

An actuator 130 is pivotally mounted to the housing base 104 by a bearing 132 and sweeps an arc (shown partially in FIG. 3A) between an inner diameter of the disk and an outer diameter of the disk. Attached to the housing 104 are upper and lower magnet return plates 110 and at least one magnet that together form the stationary portion of a voice coil motor assembly 112. The voice coil 134 is mounted to the actuator 130 and positioned in the air gap of the voice coil motor 112, which applies a force to the actuator 130 to provide the pivoting motion about the bearing 132. The voice coil motor 112 allows for precise positioning of the head 146 along the radius of the disk 120. The voice coil motor 112 is coupled with a servo system (not shown) that acts as a guidance system, using positioning data read by the head 146 from the disk 120 to determine the position of the head 146 over a track on the disk 120. Each side of a disk 120 can have an associated head 146, and the heads 146 are collectively coupled to the actuator 130 such that the heads 146 pivot in unison. The invention described herein is equally applicable to devices wherein the individual heads separately move some small distance relative to the actuator. This technology is referred to as dual-state actuation (DSA).

Figure 2:
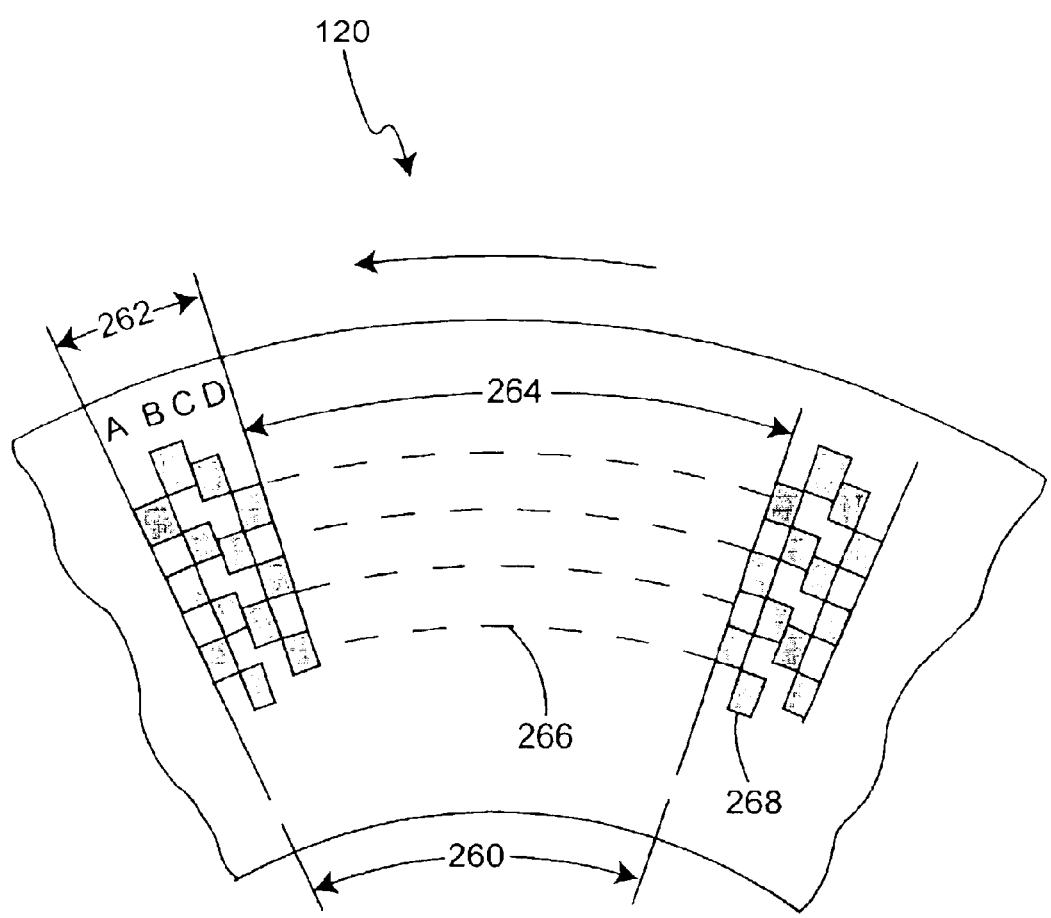
FIG. 2 is a partial detailed view of a disk from the hard disk drive shown in FIG. 1.

One type of servo system is a sectored, or embedded, servo system in which tracks on all disk surfaces contain small segments of servo data often referred to as servo wedges or servo sectors. Each track can contain an equal number of servo wedges, spaced relatively evenly around the circumference of the track. Hard disk drive designs have been proposed having different numbers of servo wedges on different tracks, and such hard disk drive designs could also benefit from the invention contained herein. FIG. 2 shows a magnified portion of the disk 120. The servo patterns 268 contained in servo fields 262 are read by the head 146 as it passes over each sector 260 and a position error signal (PES)

is generated to correct off-track deviations. One track following scheme records track following signals in bursts 268 arranged in four columns to allow for a quadrature PES. FIG. 2 shows an arrangement wherein the density of servo bursts is greater than the density of tracks by a factor of 1.5. In other embodiments, the ratio of densities can be greater or less than shown in FIG. 2; for example the density of servo bursts can be the same as the density of tracks.

In the scheme shown in FIG. 2, the centerlines of tracks are alternately defined by boundaries between bursts from columns A and B and boundaries between bursts from columns C and D. If the head 146 remains centered over a track centerline 266, a PES of zero is calculated and no change in position is required. As the path of the head 146 deviates from the track centerline 266, a difference in the relative amplitudes of successive burst signals 268 is detected by a controller (not shown), a PES is calculated, and an appropriate actuation current is applied to the voice coil motor 112, which repositions the head 146. The scheme described above is only one of many possible schemes. Drives using most (if not all) possible PES schemes could benefit from the invention contained herein.

Servo patterns can be written to the disks prior to assembly of the hard disk drive using a media writer. Stacks of disks are loaded onto the media writer and servo patterns are carefully written onto the surface of each disk, a time consuming and costly process. The invention disclosed herein is equally applicable to other methods of writing servo patterns; for example, in some embodiments, the servo patterns can be printed. The media writer attempts to write servo patterns that follow perfect, concentric circles. A phenomenon called "repeatable runout" (or "eccentricity") occurs if the axis of rotation of the disk is shifted from the center of the concentric tracks. The shifting of the center of the tracks from the axis of rotation of the disk comes about largely because the clearance between the disk and a hub of the media writer and between the disk and the hub of the spindle biases the disk along one edge of each hub. A bias resulting from the clearance between the disk and the hubs can result in eccentricities of one mil or more for each disk. For disks having a track density of 100,000 tracks per inch (TPI), this eccentricity can translate to over one hundred tracks. The eccentricity is compounded for multiple disks, most severely when the disks are biased along opposite edges as connected with the spindle.

Figure 3A:
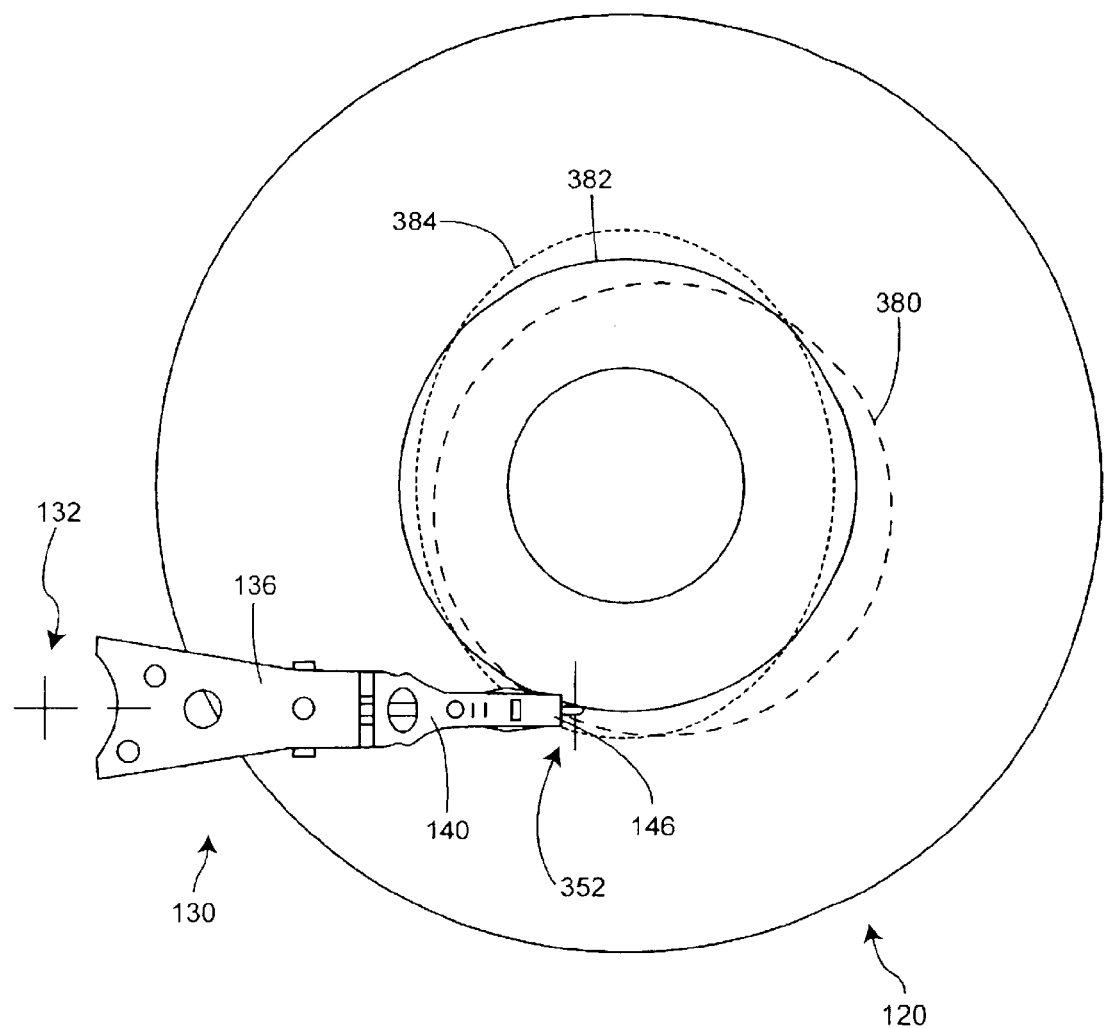
FIG. 3A illustrates the movement of a rotary actuator from the hard disk drive shown in FIG. 1 following a track with a servo pattern written using a media writer, a self-servo written servo pattern, and a servo pattern written using a method in accordance with one embodiment of the present invention.
Figure 3B:
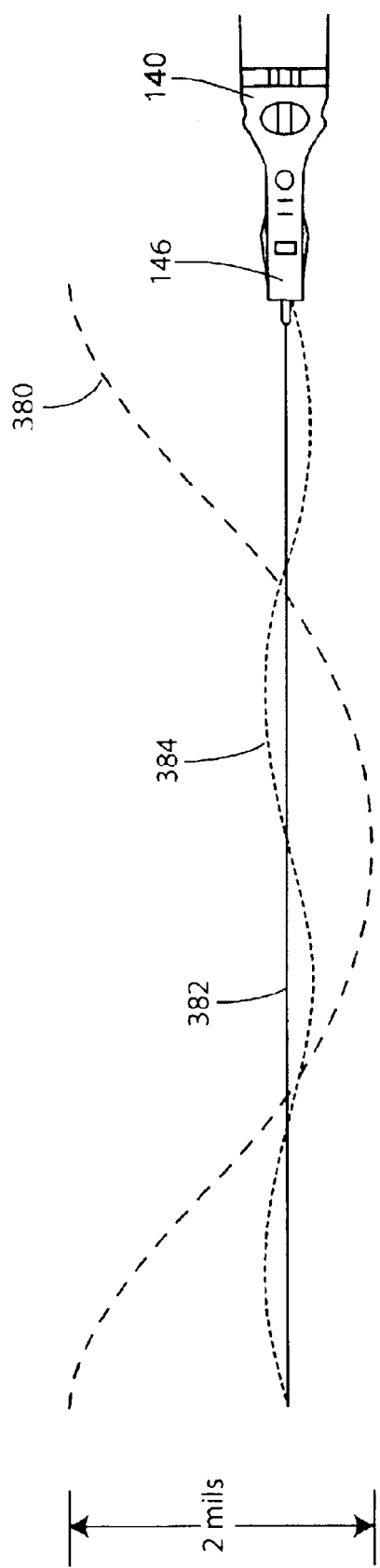
FIG. 3B illustrates the relative displacement of the rotary actuator illustrated in FIG. 3A through one revolution of the disk.

As a result of the shift between the axis of rotation and the center of the tracks, the track followed by the head is displaced laterally in a sinusoidal fashion relative to the head as the disk rotates. This sinusoidal displacement is referred to as repeatable runout, or eccentricity. FIGS. 3A and B illustrate different paths that the head 146 traces as it follows the servo pattern of a track. A servo pattern 380 written by the media writer is shown following a perfectly circular track with a center offset from the center of the spindle. The offset is exaggerated to show relative scale, and as described above can typically be one mil or more for each disk. FIG. 3B plots the total displacement of the head 146 over the course of a single revolution of the disk 120. The actuator 130 must continuously pivot about the bearing 132 so that the head 146 sweeps an arc 352 that traces the servo pattern 380 and keeps the head 146 over the center of the track. Runout compensation schemes for following eccentric tracks are well known in the art. For example, one such scheme is described in U.S. Pat. No. 5,404,253 to Painter, entitled: "Estimator-based Runout Compensation in a Disk Drive."

A disk having two surfaces for storing data will have a head associated with each surface. Similarly, additional disks will have additional heads associated with each surface of each disk. As the hard disk drive writes or reads data, the controller switches between heads to access different surfaces. The heads may not be perfectly aligned, and each head may be offset across the surface of the disk relative to every other head. This offset likely differs from the offset of the heads in the media writer. As the head follows a track along the surface of the disk, every other head connected with the actuator is generally positioned over a different track on the respective disk surface. The offset between the heads can degrade performance of the hard disk drive as lag is introduced during head switches.

One method known in the art for eliminating the effects of offset between the heads is the method of self-servo writing using a media-written disk. A master servo pattern is written on a single surface of a single disk with a media writer for use as a reference for self-writing servo patterns to all surfaces (including, possibly, the reference surface). The hard disk drive is assembled with the media-written disk alone or with the media-written disk and blank disks. The hard disk drive then self-writes servo patterns onto the storage surfaces based on the master servo pattern. As it does so, the hard disk drive can use electronics to counteract eccentricity of the master servo pattern introduced by the shift in track center, described above, before carrying out the step of self-writing the servo patterns. The master servo pattern on the reference surface is eventually over-written by user data. Other methods for writing master servo patterns, including printed-media self-servo writing and propagation self-servo writing can suffer from the effects of offset between the heads. The invention described herein is equally applicable to methods using disks having master servo patterns written other than by a media-writer.

Ideally, self-servo writing produces perfectly circular, concentric tracks with each head positioned over the same track on the head's respective surface. As can be seen in FIGS. 3A and B, a perfectly circular track 382 exhibits zero eccentricity, and therefore zero displacement of the head. But achieving zero (or nearly zero) actuator motion while following a track can degrade performance of an actuator positioning controller due to frictional effects in the bearing. The problem is more pronounced in smaller hard disk drives where smaller bearings exhibit less rotational inertia. Actuator positioning controllers are generally designed assuming that the motion dynamics of the actuator are linear or nearly linear; however, the frictional effects in the bearing limit low-frequency gain. The nonlinear behavior of bearings is further described in an article entitled "Disk Drive Pivot Nonlinearity Modeling Part I: Frequency Domain" by D. Abramovitch, F. Wang, and G. Franklin, *In the Proceedings of the* 1994 *American Controls Conference in Baltimore, Md.*, (June 1994), incorporated herein by reference.

Hard disk drives used in laptops and other mobile devices must tolerate shock and vibration, major contributors to low-frequency disturbances; however, non-linear gain response can interfere with the ability of the actuator positioning controller to reject low-frequency disturbances. An article entitled "Use of Dither in Digital Servo Control for DASD" by R. J. Daede, J. E. Mason, and H. H. Ottesen, *IBM Technical Disclosure Bulletin*, (October 1990), also incorporated herein by reference, describes overcoming frictional effects in the bearing by continuously moving the actuator. The article proposes providing a dithering signal at an integer multiple of the servo sample rate. As the head dithers, it is effectively (and intentionally) off-track between servo samples.

A method in accordance with the present invention can be used to introduce an optimal track eccentricity such that frictional effects can be overcome while the head is kept on-track between servo samples by a run-out compensation scheme. In one embodiment the method comprises the steps of writing a master servo pattern on one surface of a disk to be inserted into the hard disk drive shown in FIG. 1, assembling the hard disk drive, reading the master servo pattern from the surface of the disk, determining the optimal track eccentricity, and writing a servo pattern similar to the master servo pattern onto each surface except that the servo pattern follows the optimal track eccentricity. The master servo pattern can then be erased or over-written by user data.

The optimal track eccentricity is an eccentricity that incorporates the minimum amount of movement of the head while following the track such that the motion dynamics of the actuator are linear or approximately linear, wherein an approximately linear region of a mechanical transfer function is a region within a few decibels of a $$\frac{1}{s^2}$$

response curve. The optimal track eccentricity may incorporate once-around runout, that is, the movement of the head may vary sinusoidal with the same frequency as the period of rotation (thus the head completes one period of motion per revolution), or the optimal track eccentricity may incorporate some integer multiple of the period of rotation. The eccentricity must be an integer multiple of the period of rotation for the tracks to be continuous (i.e., not to have a large discontinuity where an end of a track meets a beginning of the track). FIGS. 3A and B illustrate an optimal track eccentricity incorporating twice-around runout 384. The head 146 completes two periods of motion for every revolution of the disk. For a disk rotating at 5400 RPM, the head oscillates at a frequency of 180 Hz.

Figure 4:
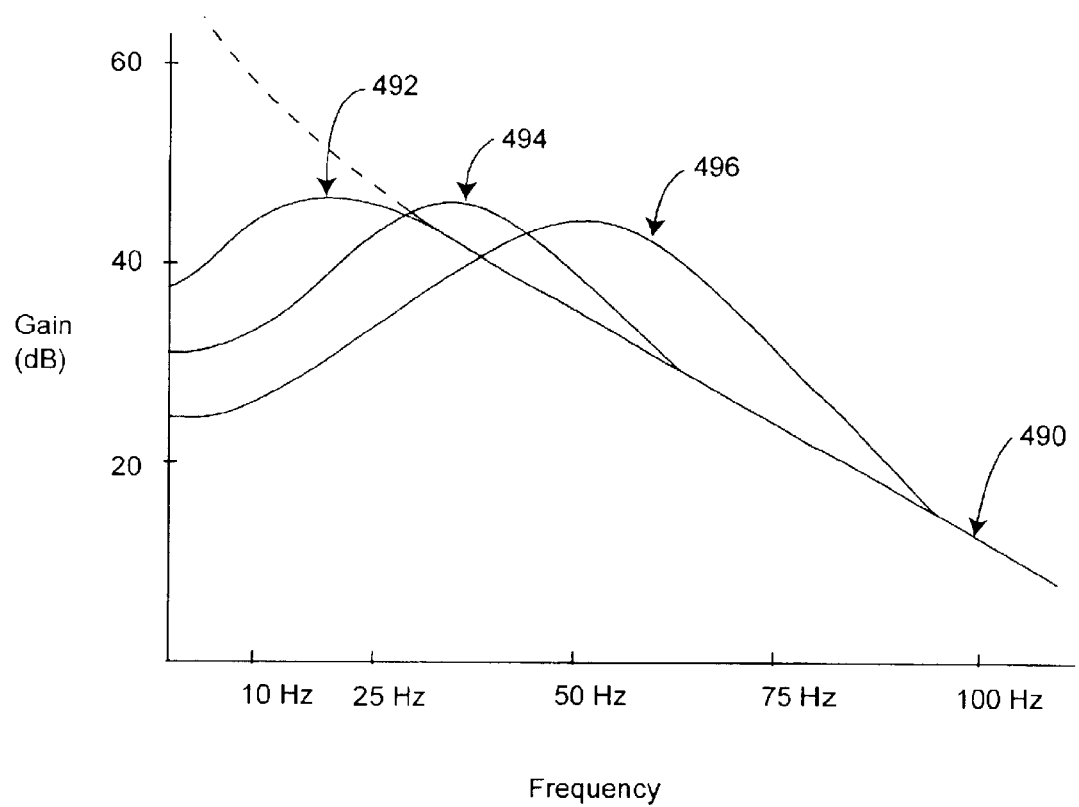
FIG. 4 illustrates an example of gain-frequency response curves for different displacements of a rotary actuator.

The amplitude of the oscillation of the head, and thus the sinusoidal movement of the optimal track eccentricity, can depend on characteristics of the actuator. For example, for smaller form factor hard disk drives utilizing smaller actuators having less rotational inertia, more angular rotation may be desired. It is possible that such increased angular rotation can be accomplished with the same or less radial displacement of the head because of the reduced length of the arm. The minimum amplitude can be calibrated for each drive by taking open-loop gain measurements for different amplitudes of motion and choosing an amplitude sufficient to produce a relatively linear dynamic response at low frequencies. FIG. 4 is a hypothetical example of the gain of an actuator following different amplitudes of motion at different frequencies of oscillation. As the amplitude of oscillation increases and more motion is incorporated, the curve shifts such that the gain is higher at lower frequencies. For example, an amplitude of oscillation equivalent to twenty track widths may produce response curve 492, while an amplitude of oscillation equivalent to four track widths may produce response curve 494, and an amplitude of oscillation equivalent to one track width may produce response curve 496. The more motion incorporated into the actuator, the higher the gain at lower frequencies. By incorporating twice-around, as shown in FIGS. 3A and B, the required amplitude may be reduced.

In an alternative embodiment, a range of response curves as shown in FIG. 4 may be produced for a given hard disk drive form factor, and an amplitude of motion maybe chosen that is not the minimum motion required for linear behavior for each individual drive, but some motion that produces linear behavior for a statistical percentage of drives produced incorporating variations in manufacturing tolerances. In such an embodiment, the optimal track eccentricity is the eccentricity that predictably produces the desired results.

As shown in FIGS. 3A and B, the optimal track eccentricity will likely incorporate less movement of the actuator than the eccentricity in the master servo pattern introduced by the clearance of the disk and the hubs. The power dissipated in the voice coil motor for an actuator following a master servo pattern with a once-around on the order of 2 mils can be as much as 0.2 Watts. Incorporating less movement of the actuator can significantly reduce the power dissipated in the voice coil motor, improving battery lifetime in mobile devices.

Further, self-writing servo patterns on additional surfaces allows heads over different surfaces to be positioned over the same tracks, thereby eliminating delays when switching between heads. A hard disk drive utilizing methods in accordance with this invention will likely have improved performance over a hard disk drive having disks with servo patterns written by a media writer. Still further, the cost and time required to write servo patterns in the media writer is reduced by minimizing the surfaces written by the media writer.

The methods described above are equally applicable to other data storage devices using moving actuators for positioning reading or writing devices; for example, a laser positioned over an optical medium, or an atomic probe positioned over a polysilicon substrate. The methods are not intended to be limited to hard disk drives technology, but are meant to be applied to any technology potentially impacted by frictional effects in actuator movement.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalence.

What is claimed is:

1. A method of self-servo writing a data storage device, the method comprising:
    rotating a disk including a surface at a first frequency;
    determining a magnetic servo pattern;
    determining an eccentricity for the magnetic servo pattern; and writing the magnetic servo pattern on the surface with a read/write head such that the magnetic servo pattern is arranged across the surface according to the eccentricity.

2. The self-servo writing method of claim 1, wherein the eccentricity is defined by an oscillation of the head.

3. The self-servo writing method of claim 2, wherein the head oscillates at a second frequency.

4. The self-servo writing method of claim 3, wherein the second frequency is twice the first frequency.

5. The self-servo writing method of claim 3, wherein the second frequency is an integer multiple of the first frequency.

6. The self-servo writing method of claim 3, wherein the head oscillates at a minimum amplitude such that an actuator connected with the head has an approximately linear gain response to a command from the data storage device to a voice coil motor driver associated with the actuator.

7. The self-servo writing method of claim 3, wherein the second frequency is the same as the first frequency.

8. The self-servo writing method of claim 1, wherein the surface has a master magnetic servo pattern; and the method further comprising:

reading the master magnetic servo pattern using the read/write head; and determining the magnetic servo pattern based on the master magnetic servo pattern.

9. The self-servo writing method of claim 8, wherein the master magnetic servo pattern is written to the at least one surface by a media writer.

10. A method of self-servo writing a data storage device having a disk including a magnetized surface having a first magnetic servo pattern, the method comprising:

rotating the disk;

determining a magnetic servo pattern;

determining an eccentricity of the magnetic servo pattern; and writing the magnetic servo pattern to the magnetized surface using a read/write head connected with an actuator such that the magnetic servo pattern is arranged across the magnetized surface according to the eccentricity.

11. The self-servo writing method of claim 10, wherein the read/write head oscillates at a minimum amplitude such that the actuator has an approximately linear gain response to a command from the data storage device to a voice coil motor driver associated with the actuator.

12. The method of claim 11, wherein the minimum amplitude is determined by measuring multiple amplitudes and selecting the smallest amplitude at which a frequency-response function is approximately linear.

13. The self-servo writing method of claim 10, wherein the eccentricity is defined by an oscillation of the head.

14. The self-servo writing method of claim 13, wherein the head oscillates at an oscillation frequency.

15. The self-servo writing method of claim 14, wherein the disk is rotated at a period of rotation and wherein the oscillation frequency is the same as the period of rotation.

16. The self-servo writing method of claim 14, wherein the oscillation frequency is twice the period of rotation.

17. The self-servo writing method of claim 14, wherein the oscillation frequency is an integer multiple of the period of rotation.

18. The self-servo writing method of claim 10, wherein the magnetized surface has a master magnetic servo pattern ; and the method further comprising:

reading the master magnetic servo pattern using the head; and determining the magnetic servo pattern based on the master magnetic servo pattern.

19. The self-servo writing method of claim 18, wherein the master magnetic servo pattern is written to the at least one surface by a media writer.

20. A method of linearizing a gain-frequency response function for a rotary actuator in a data storage device having a disk including a magnetized surface, the method comprising:

using a head connected with the rotary actuator, the head being adapted to read and write on the magnetized surface;

rotating the disk at a period of rotation;

determining a magnetic servo pattern;

oscillating the head across a portion of the magnetized surface at an integer multiple of the period of rotation;

writing the magnetic servo pattern as the head oscillates;

wherein the head oscillates at a minimum amplitude such that the gain-frequency response function for the rotary actuator is approximately linear.

21. The self-servo writing method of claim 20, wherein the magnetized surface has a master magnetic servo pattern; and the method further comprising:

reading the master magnetic servo pattern using the read/write head; and determining the magnetic servo pattern based on the master magnetic servo pattern.

22. A method of self-servo writing a data storage device, the method comprising:

rotating a disk including a first surface having a first magnetic servo pattern and a second surface, wherein the disk is rotated at a first frequency;

reading the first magnetic servo pattern using a first head adapted to read the first surface;

determining a second magnetic servo pattern based on the first magnetic servo pattern;

oscillating a second head at a second frequency, the second head being adapted to write to the second surface; and writing the second magnetic servo pattern on the second surface as the second head oscillates such that the second magnetic servo pattern is arranged across the second surface according to the oscillation of the second head.

23. A method of self-servo writing a data storage device including a first disk having a first surface with a first magnetic servo pattern and a second disk having a second surface, the method comprising:

rotating the first disk at a first frequency;

reading the first magnetic servo pattern using a first head adapted to read the first surface;

determining a second magnetic servo pattern based on the first magnetic servo pattern;

rotating the second disk at the first frequency;

oscillating a second head at a second frequency, the second head being adapted to write to the second surface; and writing the second magnetic servo pattern on the second surface as the second head oscillates such that the second magnetic servo pattern is arranged across the second surface according to the oscillation of the second head.

* * * * *